Sept. 10, 1963   JENG C. SHANG   3,103,292
ELEVATED TANK
Filed Sept. 25, 1961   2 Sheets-Sheet 1

INVENTOR.
Jeng C. Shang.
BY
Byron, Hume, Groen & Clement
Attys.

Sept. 10, 1963   JENG C. SHANG   3,103,292
ELEVATED TANK
Filed Sept. 25, 1961   2 Sheets-Sheet 2

INVENTOR.
Jeng C. Shang
BY
Byron, Hume, Groen & Clement
Attys.

United States Patent Office 3,103,292
Patented Sept. 10, 1963

3,103,292
ELEVATED TANK
Jeng C. Shang, East Chicago, Ind., assignor to Union Tank Car Company, Chicago, Ill., a corporation of New Jersey
Filed Sept. 25, 1961, Ser. No. 140,441
10 Claims. (Cl. 220—18)

The present invention relates to elevated tanks and, in particular, to elevated tanks having relatively large capacity storage vessels.

It is an object of the present invention to provide a new and improved elevated tank.

It is another object of the present invention to provide an elevated tank having a relatively small amount of external supporting construction.

It is a further object of the present invention to provide in an elevated tank a new and improved storage vessel.

It is a further object of the present invention to provide in an elevated tank a storage vessel constructed so as to have less dead water weight.

It is another object of the present invention to provide in an elevated tank a storage vessel which is designed to embody relatively thin bottom plates.

It is a further object of the present invention to provide an elevated tank wherein a central riser construction is designed to support substantial portions of the bottom of a storage vessel.

It is yet another object of the present invention to provide in an elevated tank a new and improved storage vessel having a bottom that is designed to provide less dead water weight, yet is supported by a central riser construction.

The above and other objects are realized in accordance with the present invention by providing a new and improved elevated tank embodying a storage vessel supported above the ground level. The storage vessel is of the generally toroidal type and, to this end, embodies a bottom construction having segments of a torus. The bottom portion has multiple sections which are suitably connected together to produce a minimum of dead water space, yet at the same time can be fabricated from relatively thin plates or the like. A transition riser construction is supported on the top of a riser structure to coact with the bottom sections of the storage vessel and support the weight of the vessel and its stored liquid.

The invention, both as to its organization and method of operation, taken with further objects and advantages thereof, will best be understood by reference to the following description taken in connection with the accompanying drawings, in which.

Figure 5:
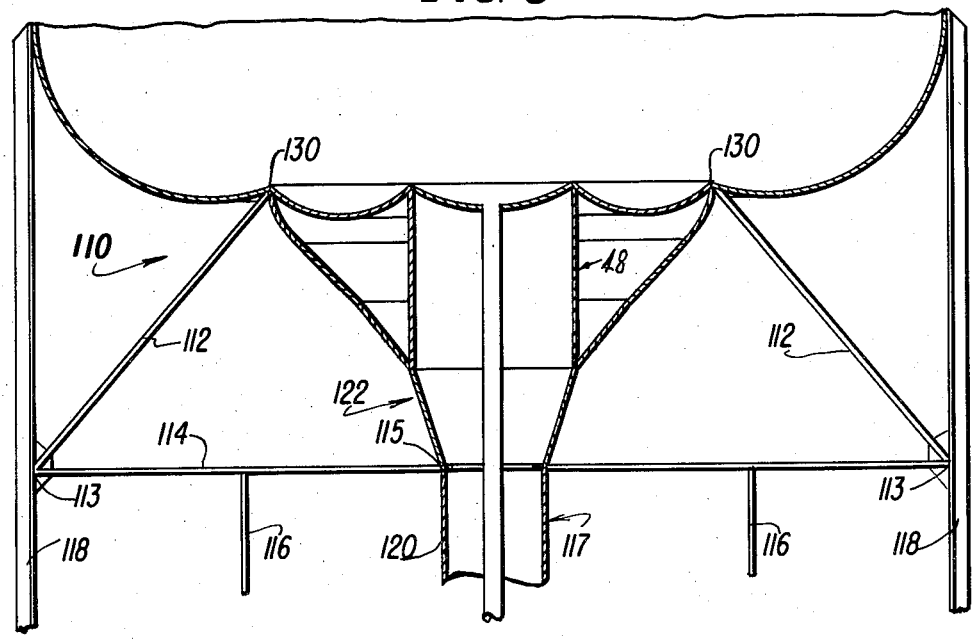
FIG. 5 is a fragmentary sectional view of a second embodiment of the tank of FIG. 1.
Figure 6:
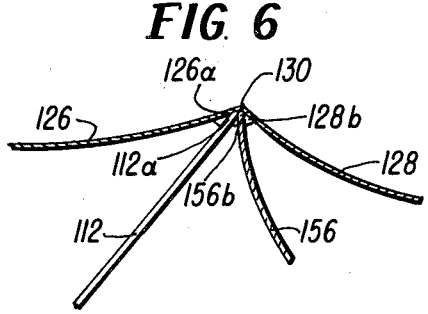
FIG. 6 is an enlarged view of a portion of the tank of FIG. 5.

Referring now to the drawings, one embodiment of the elevated tank embodying the principles of the invention is illustrated in FIGS. 1 through 4 and is generally identified by reference numeral 10. Another embodiment of an elevated tank embodying the priciples of the present invention is illustrated in FIGS. 5 and 6 and is generally identified by reference numeral 110. Both of the elevated tanks 10 and 110 are of relatively large capacity and are designed to contain approximately 500,000 gallons to 2 million gallons of liquid. Each of the elevated tanks 10 and 110 may be characterized as embodying a generally toroidal storage vessel supported by a center riser construction and an outer peripheral column structure.

Considering first the elevated tank 10 illustrated in FIGS. 1 through 4, the elevated tank 10 is supported on a suitable foundation 12 embedded in the ground 14 so as to extend vertically upward above the ground 14. The tank 10 includes a generally toroidal storage vessel 16 supported at a desired elevation above the ground 14 by both a central riser structure 17 and a plurality of peripherally arranged columns 18. The riser structure 17 briefly comprises a cylindrical body portion 20 which supports at its upper end a riser transition construction 22. The riser transition construction 22 coacts with the central bottom portion of the toroidal storage vessel 16 and is designed so that additional supporting columns located inwardly of the peripheral columns 18 are not required. The supporting columns 18 are horizontally spaced apart and coact with the side of the storage vessel 16 at points adjacent to its vertical tangency.

Figure 1:
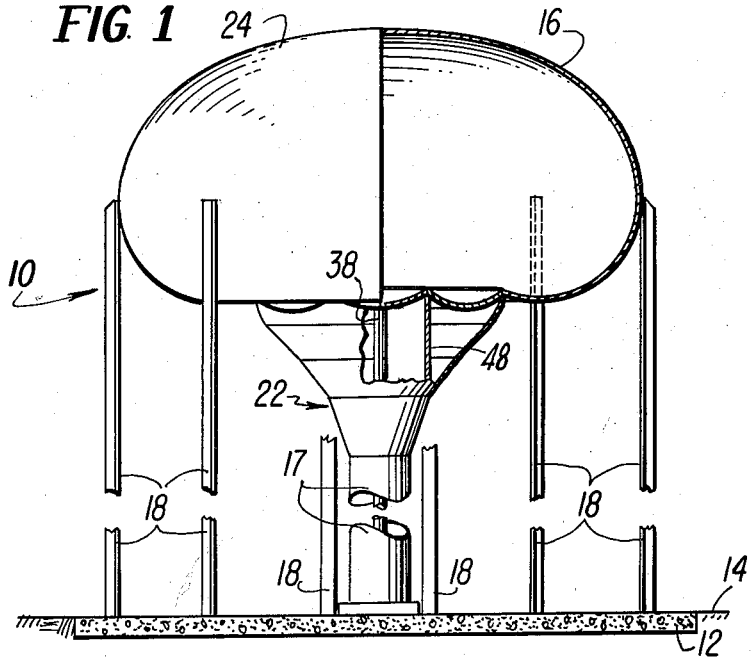
FIG. 1 is a fragmentary front elevational view of one embodiment of an elevated tank embodying the features of the present invention.
Figure 2:
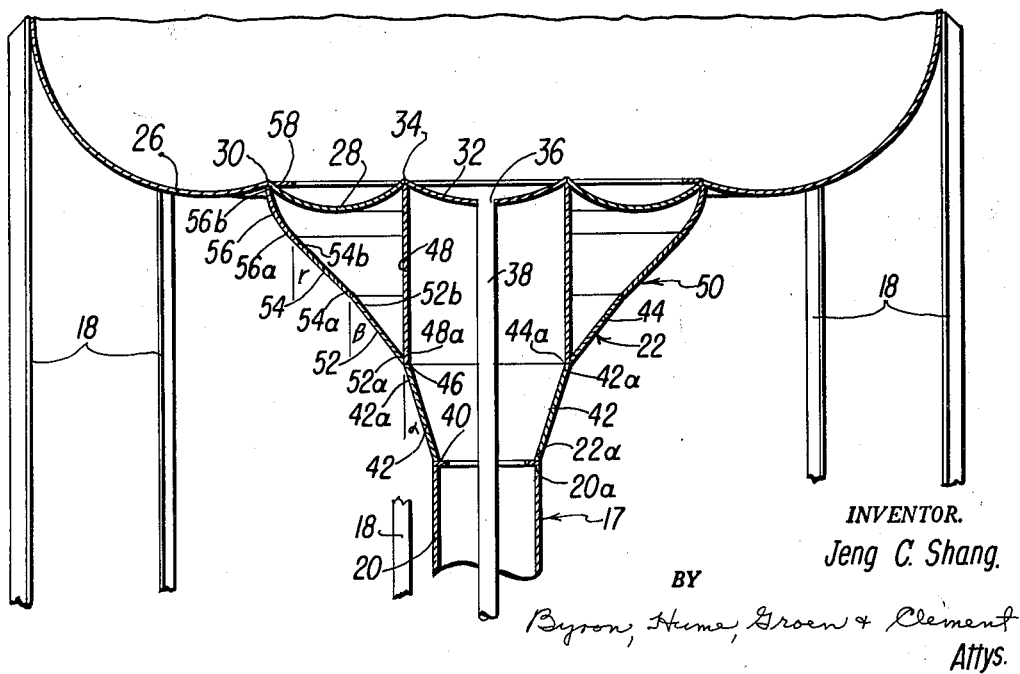
FIG. 2 is a fragmentary sectional view of the tank of FIG. 1.

Referring now to the constructional details of the toroidal storage vessel 16, it functions to house liquid, for example water, at a desired elevation and, to this end, the vessel 16 is entirely hollow. As shown in FIGS. 1 and 2, the storage vessel 16 is generally toroidal in construction and comprises a generally spherical roof portion 24 (shown only in FIG. 1) and a generally toroidal portion 26 that comprises both the side and part of the bottom of the vessel 16 (see FIG. 2). In addition to the toroidal side-bottom portion 26, the bottom of the vessel 16 comprises an intermediate toroidal section 28, the outer edge of which is appropriately connected, by welding or the like, to the inner edge of the bottom section 26, thereby defining an annular junction 30. The inner edge of the intermediate toroidal section 28 is suitably secured, by welding or the like, to the outer edge of an inner, generally curved section 32, thereby providing an annular junction 34. The inner curved section 32 in its preferred form has a generally spherical shape and is suitably apertured at 36 to accommodate the upper end of a downcomer 38 disposed within the riser transition construction 22 and the riser structure 17. As is well known, the liquid stored in the vessel 16 is conducted between the vessel 16 and the ground 14 via the downcomer 38.

The elevated storage vessel 16 is solely supported by the horizontally spaced columns 18, the riser structure 17 and its associated riser transition construction 22. As best shown in FIG. 2, the side of the vessel 16 is supported by the column 18, while the bottom of the vessel 16 is supported solely by the riser transition construction 22 and riser structure 17. Although not clearly illustrated, the riser body 20 of the riser structure 17 is fabricated from many generally cylindrical sections (not shown) that are vertically aligned and suitably secured together by welding or the like. As clearly illustrated, the riser transition construction 22 is solely supported on the upper end of the riser structure 17 and, to this end, the lower annular end 22a of the riser transition construction 22 is suitably secured by welding or the like to the upper annular end 20a of the riser body 20. In order to counteract the inwardly directed forces applied by the riser transition construction 22 to the riser structure 17, an annular compression ring 40 is fixedly secured, by welding or the like, to the junction of the above referred edges 20a and 22a. By this arrangement, the inwardly directed horizontal forces at the junction of the riser transition construction 22 and the riser 17 are absorbed by the compression ring 40, with the result that no imbalance of horizontal forces occurs.

Referring now more specifically to the constructional details of the rise transition construction 22, it comprises a lower part 42 having a hollow, generally inverted, conical shape. The conical part 42 is inclined relative to the vertical by an angle alpha which, in one form of an elevated tank designed to have a capacity 2,000,000 gallons, is approximately 17°. The upper annular end 42a of the conical part 42 is suitably secured, by welding or the like, to an annular junction 46 comprising (1) the lower annular ends 48a of an inner support cylinder 48 which directly supports the adjacent edges of the inner spherical section 32 and the intermediate toroidal section 28 and (2) the lower annular edge of an outer generally conical structure 50 which supports the junction 30 of the intermediate toroidal section 28 and the outer toroidal section 26.

Figure 4:
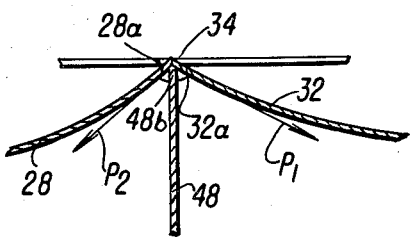
FIG. 4 is an enlarged view of a portion of the tank of FIG. 2.

More specifically, the inner support cylinder 48, as the name implies, is substantially cylindrical in shape and has a diameter equal to the diameter of the inner spherical section 32. Accordingly, as best shown in FIG. 4, the upper annular end 48b of the inner support cylinder 48 is suitably secured, by welding or the like, to the annular junction 34 of the inner section 32 and the intermediate toroidal section 28. As a result, the entire inner section 32 and a portion of the intermediate section 28 are fixedly supported by the cylinder 48.

Returning to a description of the generally conical structure 50, it is located outwardly of the inner support cylinder 48 and interconnects the junction 46 (of the lower end 48a of the cylinder 48 and the upper end 42a of the conical part 42) with the junction 30 of the outer section 26 and intermediate section 28. More particularly, the generally conical structure 50 includes a lower part 52 having a hollow and inverted conical shape. Its lower annular end 52a has a diameter slightly larger than that of the inner support cylinder 48 and is suitably secured, by welding or the like, to both the upper end 42a of part 42 and the lower end 44a of the cylinder 44. The generally conical part 52 is inclined relative to the vertical by an angle beta which, in a form of an elevated tank designed to have a capacity of 2,000,000 gallons, is approximately 38°. As shown in FIG. 2, the upper annular end 52b of the conical part 52 is suitably secured, by welding or the like, to the lower annular end 54a of an intermediate part 54 having a hollow, generally inverted, conical shape. In contrast to the lower conical part 52, the intermediate conical part 54 is inclined relative to the vertical by an angle gamma which, in a form of an elevated tank designed to have a capacity of 2,000,000 gallons, is approximately 45°.

It will be appreciated by reference to FIG. 2 that the upper annular end 54b of the generally conical part 54 is located beneath and inwardly of the junction 30 of the outer and intermediate toroidal sections 26 and 28. In order to provide maximum support for this junction 30, there is provided a so-called 45° knuckle 56 which, as clearly shown in FIG. 2, has a generally curved shape, preferably of elliptical form. The lower annular end 56a of the knuckle 56 is, of course, fixedly attached, by welding or the like, to the upper annular end 54b of the conical part 54, while the upper end 56b of the knuckle 56 is suitably secured to the junction 30.

Figure 3:
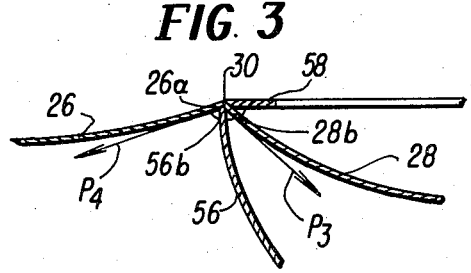
FIG. 3 is an enlarged sectional view of a portion of the tank of FIG. 2.

The connection between the knuckle 56 and the junction 30 is clearly shown in FIG. 3. As illustrated, the upper annular end 56b of the knuckle 56 is fixedly secured to the inner end 26a of the outer toroidal section 26 and also also to the outer edge 28b of the intermediate toroidal section 28. As is well known, in the design of storage vessels, it is desirable that the horizontal components of the load, i.e. the weight of the stored liquid, attributed to adjacent sections of the bottom of the vessel be substantially equal. However, because of the size of the outer toroidal section 26 relative to the intermediate toroidal section 28, there exists a horizontal force component directed outwardly, which component in the absence of additional supporting structure tends to dislocate the adjacent toroidal sections 26 and 28. Accordingly, in order to offset the outwardly directed horizontal force components, a tension ring 58 (see FIGS. 2 and 3) is fixedly secured, by welding or the like, to the junction 30. By this arrangement, the horizontal force components are effectively neutralized and an extremely stable bottom construction is provided.

It will be appreciated that by designing the storage vessel 16 differently than described above, the horizontal force components, attributed to the load carried by the toroidal section 26 and the toroidal section 28, respectively, could be equal to one another. When these force components are equal, there is no tendency for one toroidal section to dislocate an adjacent toroidal section. However, if it were desired to equate these horizontal components, it would be necessary to increase the radius of curvature of the toroidal section 28 and consequently decrease the radius of curvature of the inner section 32. The resulting effect would be that the inner section 32 would cover too small an area and, thereby, would be over-designed in the sense that it would not be stressed to its maximum allowable stress. Specifically, if the inner section 32 had a quarter inch plate thickness, which is the minimum allowable thickness for plate used in elevated tanks, the intermediate section 28 would not be stressed anywhere near its allowable stress. Accordingly, the design of the inner section 32 would be highly inefficient since a much thinner plate than the minimum allowable plate thickness could be used. Hence, the cost of the elevated tank would be unnecessarily increased.

On the other hand, if it were desired to equalize the above horizontal force components at the junction 30, the radius of curvature of the intermediate section 28 would have to be increased to such an extent that a much thicker plate would be required.

In accordance with the present invention, the outer section 26, the intermediate section 28, and the inner section 32 (the bottom of the storage vessel 16) are designed to develop their maximum allowable stresses, thereby providing a highly efficient bottom for the storage vessel 16 requiring a minimum of cost. At the same time, the bottom of the storage vessel 16 is designed to have a minimum of "dead water" space, which is defined by the concave portions of the bottom lying beneath the upper end of the downcomer 38. This design is made possible to some extent by the use of the inner support cylinder 48 acting on the junction 34 of the inner and intermediate sections 32 and 28 and, also, the tension ring 58 acting on the junction 30 of the outer and intermediate sections 26 and 28.

Considering now in greater detail an analysis of the load force components, attention is invited to FIGS. 3 and 4. In FIG. 4 wherein the junction 34 is illustrated, the forces attributed to the weight of the water carried by the inner section 32 and the intermediate section 28 (and acting tangentially at the junction 34) are represented as force vectors, identified as $P_1$ and $P_2$, respectively. It will be noted that the force vector $P_1$ is directed inwardly while the force vector $P_2$ is directed outwardly. Because of the disposition and magnitude of these force vectors, it is apparent that the resultant horizontal component is directed outwardly. However, at the junction 34, the inner support cylinder 48 effectively resists and overcomes this outwardly directed horizontal component thereby preventing an imbalance of forces at the junction 34 and, furthermore, absorbs the vertical component of the forces.

With respect to the junction 30 illustrated in FIG. 3, it will be appreciated that the forces attributed to the weight of water carried by the intermediate section 28 and the outer section 26 (and acting tangentially at the junction 30) are represented as force vectors, identified as $P_3$ and $P_4$. As shown, the force vector $P_3$ is directed inwardly, while the force vector $P_4$ is directed outwardly. Because of their relative disposition and magnitude, the resultant horizontal component is directed outwardly. At the junction 30, the tension ring 58 effectively resists and offsets this outwardly directed horizontal component, thereby preventing an imbalance of forces at the junction 30. Of course, the vertical component of the forces is absorbed by the knuckle 56.

Although the riser transition construction 22 has been described as comprising a conical part 42 disposed below an inner support cylinder 48 (about which is disposed a pair of conical parts 52 and 54 and a knuckle 56), it should also be understood that, depending upon the design and capacity of a tank of the present invention, the riser transition construction can be differently constructed. For example, if the inner spherical section has a larger diameter than that illustrated, a pair of conical parts could be disposed beneath the support cylinder and a single conical part, as well as a 45° knuckle, could be disposed about the cylinder, which of course would have a larger diameter than that illustrated. Alternatively, instead of using an inner support cylinder 48, a generally conical inner support could be used. In either case, the inner support member would function to overcome any imbalance of horizontal force attributed to the weight of the load carried by the inner and intermediate sections at the junction 34. Hence, it will be appreciated that the riser transition construction can be modified in accordance with the demands of the particular installation, but irrespective of its modified form, the transition construction will nonetheless support the junctions 30 and 34 of the bottom of the storage vessel 16.

Considering now the embodiment of the elevated tank 110 illustrated in FIGS. 5 and 6, the elevated tank 110 embodies the same constructional components as the tank 10, with the exception that inwardly directed columns and associated ties are substituted for the tension ring 58. In the interest of avoiding unnecessary duplication of description, the constructional details of the riser, riser transition construction, and the elevated storage vessel will not be repeated. Instead, components in the elevated tank 110, which are identical to components in elevated tank 10, will be identified by reference numerals increased by 100.

As previously suggested, instead of using a tension ring 58 at the junction 30, a plurality of inclined columns 112 (only two of which are shown) extend between the junction 130 and the columns 118. Specifically, as shown in FIG. 6, the inner end 126a of the outer toroidal section 126, the outer end 128b of the intermediate toroidal section 128, the upper end 156b of the knuckle 156, and the upper end 112a of the inclined column 112 are suitably secured together, by welding or the like. Hence, even though the resultant horizontal force component is directed outwardly, the inclined supporting column 112, having compression characteristics, produces an inwardly directed force component that effectively resists and overcomes the resultant horizontal component. As shown in FIG. 5, additional supporting structure may alternatively be used and, in this connection, ties 114 are disposed between the junction 113 of the inclined column 112 and the vertical column 118 and the junction 115 of the riser structure 117 and the riser transition structure 122. Additional columns 116 may be provided so as to extend between an intermediate point on each of the ties 114 and supporting structure located beneath the ties. Accordingly, irrespective of whether a tension ring or an inclined column construction is employed, the bottom of the storage vessel 16 is optimumly designed to provide an extremely efficient construction which is economical to build and which has extremely little "dead water" space.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. An elevated tank comprising a vessel for storing liquids at an elevated level; said vessel having a bottom including an outer generally toroidal section, an intermediate generally toroidal section, and an inner generally curved section; supporting means coacting with the vessel at points outwardly of the lowest portion of the outer section for supporting the vessel and its stored liquid; riser transition construction including means supporting the juncture of the outer and intermediate sections and the juncture of the intermediate and inner sections; and a riser structure coacting with the riser transition construction for supporting the vessel and its stored liquid.

2. An elevated tank comprising a vessel for storing liquids at an elevated level; said vessel having a bottom including an outer generally toroidal section, an intermediate generally toroidal section, and an inner generally curved section; supporting means coacting with the vessel at points outwardly of the lowest portion of the outer section for supporting the vessel and its stored liquid; riser transition construction including means supporting the juncture of the outer and intermediate sections and the juncture of the intermediate and inner sections; means connected to the juncture of the outer and intermediate sections for counteracting an imbalance of the horizontal components of the load forces of the outer and intermediate sections acting at the juncture; and a riser structure coacting with the riser transition construction for supporting the vessel and its stored liquid.

3. An elevated tank comprising a vessel for storing liquids at an elevated level; said vessel having a bottom including an outer generally toroidal section, an intermediate generally toroidal section, and an inner generally curved section; supporting means coacting with the vessel at points outwardly of the lowest portion of the outer section for supporting the vessel and its stored liquid; riser transition construction including means supporting the juncture of the outer and intermediate sections and the juncture of the intermediate and inner sections; a riser structure coacting with the riser transition construction for supporting the vessel and its stored liquid, and a downcomer arrangement located within said riser transition construction and said riser structure for conducting liquid between the vessel and the ground.

4. An elevated tank comprising a vessel for storing liquids at an elevated level; said vessel having a bottom including an outer generally toroidal section, and intermediate generally toroidal section, and an inner generally curved section, said outer, intermediate, and inner sections being suitably secured together in liquid-tight relationship; means coacting with the vessel to support the weight of the vessel and its stored liquid; riser transition construction including means supporting the juncture of the outer and intermediate sections and the juncture of the intermediate and inner sections; and a riser structure coacting with the riser transition construction for supporting the vessel and its stored liquid.

5. An elevated tank comprising a vessel for storing liquids at an elevated level; said vessel having a bottom including an outer generally toroidal section, an intermediate generally toroidal section suitably secured along its outer edge to the inner edge of said outer section, and an inner generally curved section secured along its outer edge to the inner edge of said intermediate section; means engaging the outer toroidal section at joints outwardly of its lowest portion for supporting the vessel and its stored liquid; riser transition construction including means supporting the joined edges of said outer section and intermediate section and the joined edges of said intermediate section and said inner section; means connected to the intersection of the outer and intermediate sections for counteracting an imbalance of horizontal components of the load forces of the outer and intermediate sections acting at the intersection, and a riser structure supporting the riser transition construction for supporting the storage vessel and its stored liquid.

6. An elevated tank comprising a vessel for storing liquids at an elevated level; said vessel having a bottom including an outer generally toroidal section, said outer, intermediate, and inner sections being suitably secured together in liquid-tight relationship; means coacting with the vessel to support the weight of the vessel and its stored liquid; riser transition construction including an upwardly and outwardly flared bottom portion, means supported by the bottom portion for supporting the juncture of the inner and intermediate sections, and means supported by the bottom portion for supporting the juncture of the intermediate and outer sections; and a riser structure coacting with the bottom portion of the riser transition construction for supporting the vessel and its stored liquid.

7. An elevated tank comprising a vessel for storing liquids at an elevated level; said vessel having a bottom including an outer generally toroidal section, said outer, intermediate, and inner sections being suitably secured together in liquid-tight relationship, means coacting with the vessel to support the weight of the vessel and its stored liquid; riser transition construction including an upwardly and outwardly flared bottom portion, mean supported by the bottom portion for supporting the juncture of the inner and intermediate sections, and means supported by the bottom portion for supporting the juncture of the intermediate and outer sections; means connected to the juncture of the outer and intermediate sections for counteracting an imbalance at the juncture of the horizontal components of the load forces of the outer and intermediate sections acting at the juncture; and a riser structure coacting with the bottom portion of the riser transition construction for supporting the vessel and its stored liquid.

8. The tank of claim 6 wherein said means supporting the juncture of the intermediate and outer sections includes an outwardly flared section and a curved section supported by said flared section and terminating in a substantially vertically oriented section that coacts with the last mentioned juncture.

9. The tank of claim 2 wherein said counteracting means comprises tension ring means for opposing the resultant outwardly directed horizontal component of the load forces provided by the intermediate and outer sections.

10. The tank of claim 2 wherein said counteracting means comprises a plurality of inclined column means interconnecting the juncture of the intermediate and outer sections and the vessel supporting means.

References Cited in the file of this patent

UNITED STATES PATENTS

| | | |
|---|---|---|
| 2,335,184 | Houseman | Nov. 22, 1943 |
| 2,349,096 | Jackson | May 16, 1944 |
| 2,768,432 | Hines | Oct. 30, 1956 |
| 2,961,118 | Miller | Nov. 22, 1960 |